United States Patent
Song

(10) Patent No.: US 8,369,163 B2
(45) Date of Patent: Feb. 5, 2013

(54) MEMORY DEVICE FOR REDUCING PROGRAMMING TIME

(75) Inventor: Sang Hyun Song, Ichon-shi (KR)

(73) Assignee: SK Hynix Inc., Gyeonggi-do (KR)

( * ) Notice: Subject to any disclaimer, the term of this patent is extended or adjusted under 35 U.S.C. 154(b) by 273 days.

(21) Appl. No.: 12/839,364

(22) Filed: Jul. 19, 2010

(65) Prior Publication Data

US 2011/0161567 A1    Jun. 30, 2011

(30) Foreign Application Priority Data

Dec. 24, 2009    (KR) .................. 10-2009-0130727

(51) Int. Cl.
    *G11C 7/10*    (2006.01)
    *G06F 13/00*   (2006.01)

(52) U.S. Cl. .............. 365/189.17; 365/189.12; 365/201; 711/103

(58) Field of Classification Search .............. 365/189.17
    See application file for complete search history.

(56) References Cited

U.S. PATENT DOCUMENTS

| | | | |
|---|---|---|---|
| 6,963,502 B2 * | 11/2005 | Park | 365/185.11 |
| 7,310,275 B2 | 12/2007 | Cha | |
| 7,313,028 B2 | 12/2007 | Ju | |
| 7,349,256 B2 * | 3/2008 | Park et al. | 365/185.11 |
| 7,363,555 B2 * | 4/2008 | Lee | 714/718 |
| 7,532,525 B2 * | 5/2009 | Ko | 365/201 |
| 7,843,734 B2 * | 11/2010 | Park | 365/185.11 |
| 7,941,586 B2 * | 5/2011 | Kim | 711/103 |
| 2005/0172086 A1 * | 8/2005 | Kawai | 711/154 |
| 2006/0198188 A1 | 9/2006 | Ju | |
| 2006/0203548 A1 * | 9/2006 | You | 365/185.12 |
| 2007/0067705 A1 | 3/2007 | Kim | |
| 2008/0229000 A1 | 9/2008 | Kim | |
| 2011/0273944 A1 * | 11/2011 | Park | 365/189.15 |

FOREIGN PATENT DOCUMENTS

| | | |
|---|---|---|
| JP | 2006-228396 | 8/2006 |
| JP | 2006-228402 | 8/2006 |
| JP | 2006-236553 | 9/2006 |
| JP | 2008-226245 | 9/2008 |
| KR | 10-2009-0068616 A | 6/2009 |
| KR | 10-2009-0122686 A | 12/2009 |

\* cited by examiner

*Primary Examiner* — Son Mai

(74) *Attorney, Agent, or Firm* — William Park & Associates Ltd.

(57) ABSTRACT

A non-volatile memory device includes: first and second planes each comprising a plurality of non-volatile memory cells; first and second buffer corresponding to the first and second planes, respectively; an input/output control unit configured to selectively control input/output paths of data stored in the first and second page buffers; a flash interface connected to the input/output control unit; and a host connected to the flash interface.

6 Claims, 3 Drawing Sheets

US 8,369,163 B2

MEMORY DEVICE FOR REDUCING PROGRAMMING TIME

CROSS-REFERENCE TO RELATED APPLICATION

The present application claims priority under 35 U.S.C. §119(a) to Korean Application No. 10-2009-0130727, filed on Dec. 24, 2009, in the Korean Intellectual Property Office, which is incorporated herein by reference in its entirety as if set forth in full.

BACKGROUND

1. Technical Field

The present invention relates to a non-volatile memory device, and more particularly, to a non-volatile memory device for reducing a programming time.

2. Related Art

A non-volatile semiconductor memory device such as a NAND flash memory device typically includes electrically erasable and programmable memory cells.

NAND flash memory devices have a read time in the tens of μs (microseconds) per kilobyte and a programming time in the hundreds of μs per kilobyte. Furthermore, NAND flash memory devices, by their nature, require an erase operation before a write operation. This erase operation takes up to several milliseconds, lengthening the required time for programming the desired data.

For example, in the event of a write command from an external host, a considerable amount of time is needed to store data into a NAND flash memory cell, as the data must be transmitted from the external host to the flash memory cell, and the cell must also complete the erase and write operations.

SUMMARY

In one embodiment of the present invention, a memory device includes: first and second planes each comprising a plurality of non-volatile memory cells; first and second buffer corresponding to the first and second planes, respectively; an input/output control unit configured to selectively control input/output paths of data stored in the first and second page buffers; a flash interface connected to the input/output control unit; and a host connected to the flash interface.

BRIEF DESCRIPTION OF THE DRAWINGS

Features, aspects, and embodiments are described in conjunction with the attached drawings, in which.

DETAILED DESCRIPTION

Hereinafter, a semiconductor storage system according to an embodiment of the present invention is described below with reference to the accompanying drawings.

Figure 1:
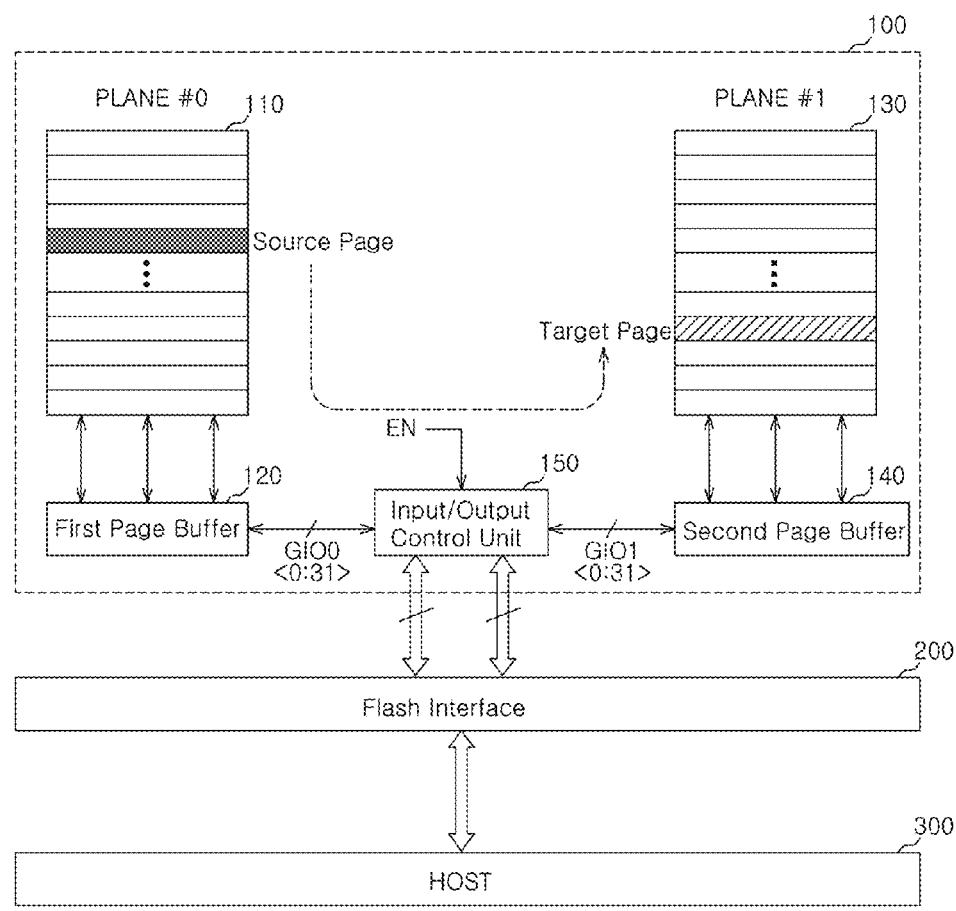
FIG. 1 is a block diagram of a non-volatile memory device according to one embodiment.

First, referring to FIG. 1, a non-volatile memory device according to an embodiment of the present invention is described.

FIG. 1 is a block diagram of a non-volatile memory device according to an embodiment. The example of a non-volatile memory device illustrated here is a NAND flash memory device.

Referring to FIG. 1, the non-volatile memory device includes a memory area 100, a flash interface 200, and a host 300.

The memory area 100 is connected to the flash interface 200 through first and second global line groups GIO0<0:31> and GIO1<0:31>. In this embodiment, the first and second global line groups GIO0<0:31> and GIO1<0:31> have a data bandwidth of 32 bits. In this embodiment, the first and second global line groups GIO0<0:31> and GIO1<0:31> are distinct from each other, but they are in effect interconnected. The first and second global line groups are named as such to illustrate that they are each connected to the respective page buffer (120, 140), for reference purposes. That is, the first global line group GIO0<0:31> is a signal line group connected to the first page buffer 120, and the second global line group GIO1<0:31> is a signal line group connected to the second page buffer 140. No additional signals are needed to control the first and second global line groups GIO0<0:31> and GIO1<0:31>. When first and second planes 110 and 130 corresponding to an input address including plane information and page information are in operation, the page buffers 120 and 140 connected to the first and second planes 110 and 130, respectively, may be also driven.

The flash interface 200 is connected to the host 300 through data input/output lines IO. In addition, the flash interface 200 includes a plurality of pads through which signals are transmitted to and from the first and second global line groups GIO0<0:31> and GIO1<0:31>. For example, there may be eight data input/output lines IO of the flash interface 200 connected to the host 300. The flash interface 200 sends to and receives from the host 300 control commands, address signals, and data signals.

Specifically, the memory area 100 includes a plurality of planes 110 and 130.

The first plane 110 (PLANE #0) includes a plurality of pages containing a memory cell array.

The first page buffer 120 temporarily stores data of a page in the first plane 110 so that read and write operations for the page may be performed. Then, the data of the corresponding page buffer selected by an input address may be input or output by using the first page buffer 120. Furthermore, a typical copy back function may be supported by using the first page buffer 120.

The copy back function refers to the transfer of data of a particular page to another page within the same plane using page buffers 120 and 140, and without use of the host 300, which is outside the memory area 100, and thus supports direct copy operations within the flash memory area.

The second plane 130 (PLANE #1) and the second page buffer 140 are provided in correspondence to the first plane 110 and the first page buffer 120.

The second plane 130 includes a plurality of pages containing a memory cell array. The second page buffer 140 corresponds to the pages of the second plane 130.

According to an embodiment of this invention, an input/output control unit 150 is provided between the first page buffer 120 and second page buffer 140, and controls input/output paths of the data of the first and second page buffers 120 and 140 in response to a control signal EN. In other words, the input/output control unit 150 may copy data between different planes by using the copy back function, without being restricted to the same plane.

In a conventional memory device, when data stored in a certain page within the first plane 110 is to be transmitted and stored into another page within the second plane 130, the source page of the first plane 110 is read and stored into the first page buffer 120. Then, the stored data is read by the host 300 via the flash interface 200, and the host 300 provides the read data to the second page buffer 140 through the flash interface 200. Afterwards, the data stored in the second page buffer 140 is stored in a free page of the second plane 130.

As such, a lot of time is conventionally required to store data using pages from different pages, and using the flash interface 200 and host 300. Furthermore, there are at least 32 global lines in the memory area 100. On the other hand, there are fewer input/output lines (IO lines) connected to the flash interface 200 and the host 300—typically eight. That is, the host 300 divides 32 read data bits into groups of eight bits in response to a predetermined signal, and transmits to and receives from the flash interface 200 such data. Therefore, in a conventional memory device, since the bandwidth of the data inputted and outputted from the memory area 100 is different from that of the data transmitted and received by the host 300, the transfer speed of the data is inevitably limited.

However, according to an embodiment of this invention, the input/output control unit 150 uses the copy back function such that the host is not used, when the data of the source page within the first plane 110 is stored into a target page of the second plane 130.

In the conventional copy back function, a source page can only be copied into a target page within the same page.

However, according to one embodiment of the present invention, when data is to be transferred between pages of different planes, the data may be transferred between the first and second page buffer 120 and 140 to store the data, without using the host 300. Therefore, the data storage time may be reduced even when the source plane is different from the target plane, because the host 300 is not used. In addition, the data transmission is performed by using the first and second global line groups GIO0<0:31> and GIO1<0:31> within the memory area 100. Therefore, since the whole 32-bit bandwidth is used, the data transmission speed is high.

The input/output control unit 150 for controlling the data transmission between the different planes 110 and 130 will be described below.

Figure 2:
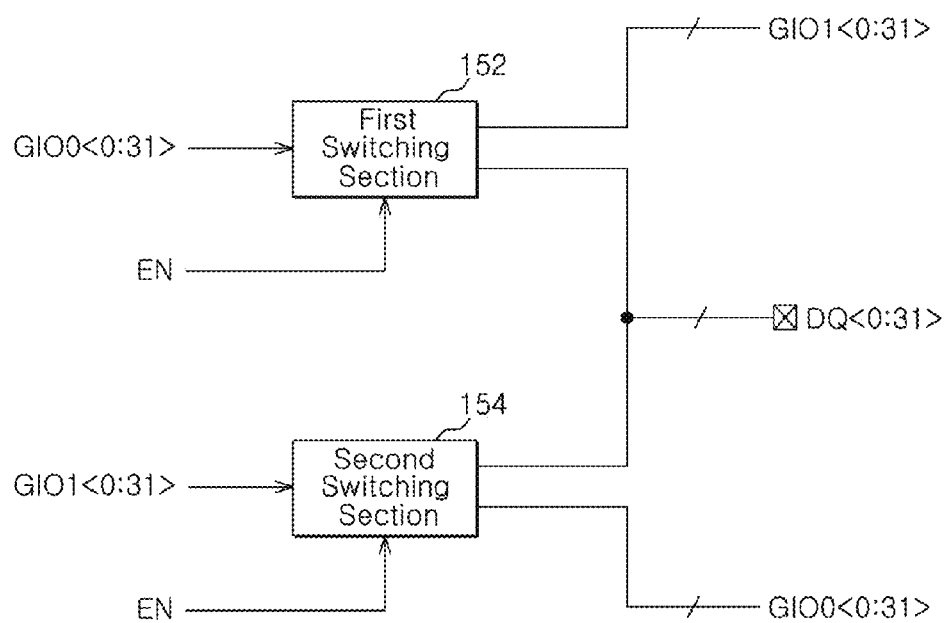
FIG. 2 is a block diagram of an input/output control unit in accordance with FIG. 1.

FIG. 2 is a block diagram of the input/output control unit 150 of FIG. 1.

Referring to FIG. 2, the input/output control unit 150 includes a first switching section 152 and a second switching section 154.

The first switching section 152 may selectively provide a signal path of the first global line group GIO0<0:31> to the second to global line group GIO1<0:31> and a DQ page DQ<0:31> in response to a control signal EN.

The second switching section 154 may selectively provide a signal path of the second global group GIO1<0:31> to the first global line group GIO0<0:31> and the DQ pad DQ<0:31> in response to a control signal EN.

The control signal EN may be activated by using a test mode signal. That is, when the copy back function is to be used without being restricted to any particular planes, the control signal EN may be activated. Furthermore, as described above the DQ pad DQ<0:31> may be provided in the flash interface 200.

Therefore, in contrast with the conventional technology, the first global line group GIO0<0:31> is not only connected, to the DQ pad DQ<0:31> within the flash interface 200, but the signal of the first global line group GIO0<0:31> may be also transmitted to the second page buffer 140 in response to the control signal EN, according to one embodiment of this invention. Similarly, the signal of the second global line group GIO1<0:31> may be transmitted to the first page buffer 120.

Put differently, according to an embodiment of this invention, the signal path through which the data stored in the first page buffer 120 can be transmitted to the second page buffer 140 may be provided within the memory area 100, without the involvement of the host 300.

Figure 3:
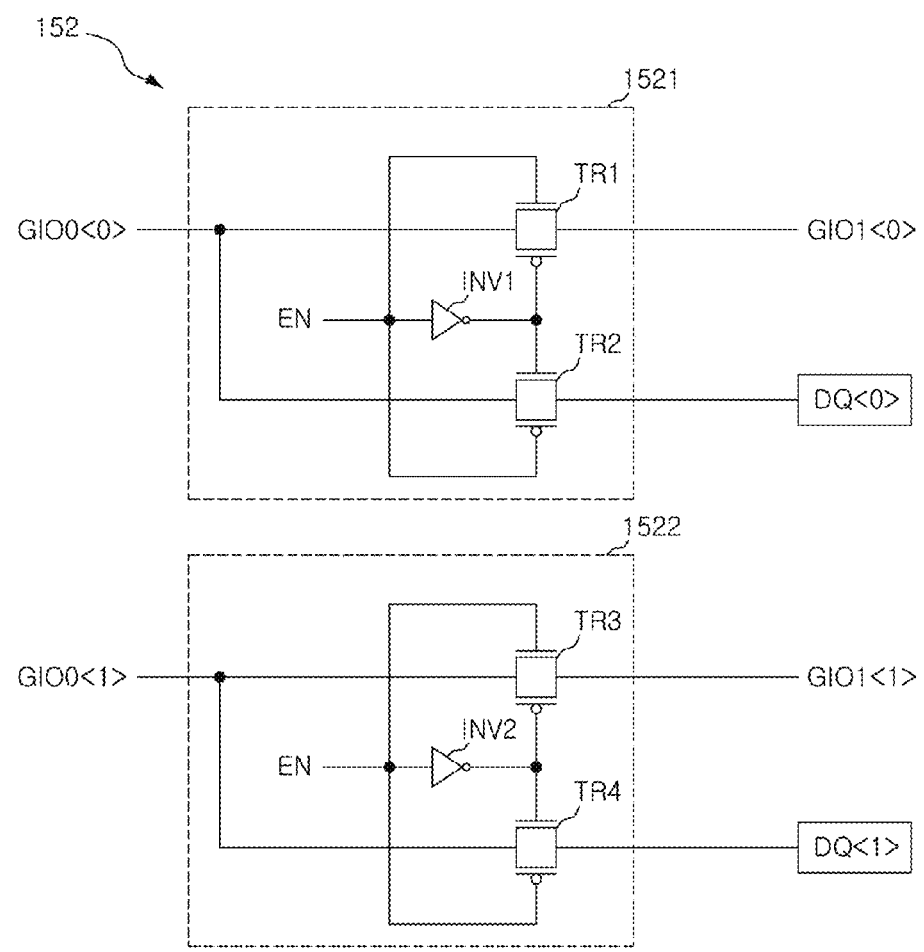
FIG. 3 is a circuit diagram of a first switching unit in accordance with FIG. 2.

FIG. 3 is a circuit diagram of the first switching section 152 of FIG. 2. Since the configuration and operational principle of the second switching section 154 are similar to those of the first switching section 152, a detailed description will be given as to the first switching section 152 to avoid duplication.

Referring to FIG. 3, the first switching section 152 includes a plurality of transmission units 1521, 1522, . . . connected to the respective global lines of the first global line group GIO0<0:31>.

First, the first transmission unit 1521 connects a signal path of the first global line GIO0<0> of the first global line group GIO0<0:31> to the first global line GIO1<0> of the second global line group GIO1<0:31> or the DQ pad DQ<0> in response to the control signal EN.

Similarly, the second transmission unit 1522 selectively provides a signal path of the second global line GIO0<1> of the first global line group GIO0<0:31> to the second global line GIO1<1> of the second global line group GIO1<0:31> or the DQ pad DQ<1> in response to the control signal EN.

The first transmission unit 1521 includes first and second transmission gates TR1 and TR2 and an inverter INV1.

Similarly, the second transmission unit 1522 includes third and fourth transmission gates TR3 and TR4 and an inverter INV2.

Again referring to FIGS. 1 through 3, a case in which the copy back mode is performed without being restricted to particular planes will be described.

An example may be taken where data of a source page of the first plane 110 is to be stored in a target page of the second plane 130.

At this time, a typical copy back read command is used to read the data of the source page of the first plane 110 into the first page buffer 120. In this case, an address corresponding to the source page of the first plane 110 is inputted when the copy back read command is given.

Then, the control signal EN is activated in response to a new copy back command (not shown), which is used without being restricted to particular planes. In this case, an address corresponding to the target page of the second plane 130 is inputted to the new copy back command.

Continuously, the first transmission gate TR1 is turned on and the second transmission gate TR2 is turned off in response to an activated high-level control signal EN.

Accordingly, the signal path of the first global line GIO0<0> of the first global line group GIO0<0:31> may be connected to the first global line GIO1<0> of the second global line group GIO1<0:31>. As such, the data of the first page buffer 120 may be transmitted through the second global line group GIO1<0:31> from the first global line group GIO0<0:31> and stored in the second page buffer 140, while maintaining the 32-bit bandwidth. Subsequently, the data of the second page buffer 140 may be transferred and stored into the target page of the second plane 130 corresponding to the address.

When a normal command is given, the control signal EN is deactivated. In this case, the second transmission gate TR2 is turned on and the first transmission gate TR1 is turned off in response to the deactivated low-level control signal EN. Therefore, the signal of the first global line GIO0<0> of the first global line group GIO0<0:31> is transferred to the pad DQ<0>.

According to one embodiment of this invention, the actual programming time of data without any plane restriction may include the time tR required for reading source data from the first plane 110 into the first page buffer 120, the time tTR required for transferring the source data using the first and second line groups GIO0<0:31> and GIO1<0:31>, and the program time tPROG required for storing the data from the second page buffer 140 into the target page of the second plane 130.

That is, the time it takes to transfer data in units of 8 bits (1-byte) between the flash interface 200 and the host 300, and again from the host 300 to the flash interface 200 may be reduced. Frequent involvement of the host 300 increases the load of the system and inevitably hampers the data processing speed.

According to the above-described embodiment, the simple switching circuit may be provided and the copy back command may be used to directly control the data transfer between different planes within the memory area. Therefore, since the data storage is performed without being transferred to the host 300 while maintaining the bandwidth, the data transmission time and the data programming time may be reduced.

Those skilled in the art understand that this invention may be practiced in another embodiment without altering its technical theory or essential characteristics, and therefore that the above embodiments are examples only and not limiting. The scope of this invention is represented by the scope of the claims provided below, rather than by the above detailed descriptions. The patent claims, including all changes and amendments thereto, shall be part of the scope of this invention.

What is claimed is:

1. A memory device comprising:
   first and second planes each comprising a plurality of non-volatile memory cells;
   first and second page buffers corresponding to the first and second planes, respectively;
   an input/output control unit configured to selectively control input/output paths of data stored in the first and second page buffers;
   a flash interface connected to the input/output control unit; and
   a host connected to the flash interface, wherein the input/output control unit allows the data stored in the first and second page buffers to be transmitted between each other when the control signal is activated.

2. The memory device according to claim 1, wherein the input/output control unit selectively provides a path of data transmission between the first and second buffers or a path of data transmission between the flash interface and the first and second page buffers, in response to the control signal.

3. The memory device according to claim 2, wherein the control signal is a test mode signal which is activated when the data transmission between the first and second planes is allowed in a state in which the host is excluded.

4. The memory device according to claim 2, wherein the input/output control unit provides the path of the data transmission between the flash interface and the first and second page buffers when the control signal is deactivated.

5. The memory device according to claim 1, further comprising: a first global line group connected to the first page buffer; and a second global line group connected to the second page buffer.

6. The memory device according to claim 4, wherein the flash interface and the host are connected to each other through data lines, and the number of data lines is smaller than the number of global lines of the first and second global line groups.

* * * * *